UNITED STATES PATENT OFFICE.

ARCHIBALD B. TRIPLER, OF NEW ORLEANS, LOUISIANA.

IMPROVEMENT IN PRESERVING WOOD FOR RAILROAD-TIES AND FOR OTHER PURPOSES.

Specification forming part of Letters Patent No. 104,917, dated June 28, 1870.

*To all whom it may concern:*

Be it known that I, ARCHIBALD B. TRIPLER, of the city of New Orleans and parish of Orleans, in the State of Louisiana, have invented a new and useful Process for Preventing the Decay of Wood and other fibrous materials; and I do hereby declare that the following is a full, clear, and exact description thereof, which will enable those skilled in the art to carry out my invention.

My invention relates to preserving wood and other fibrous material from decay, not only from atmospheric causes, but from dry-rot and destruction by worms; and it consists in boring the timber to be preserved with a central hole or holes extending from one end to the other, and filling them from both ends with chloride of arsenic, or chloride of sodium (common salt) and chloride of arsenic combined, in equal or unequal parts, either in a dry or semi liquid form, and then plugging up both ends of the hole or holes so as to seal a continuous and uninterrupted strata of preservative agents throughout its length, which forms a chemical combination with the tannin and resinous matter, and permeates the cellular tissues in longitudinal and transverse lines from one end to the other, so that every part of the tie is protected from dry-rot and fermentation, and is rendered compact and hard, effectually destroying and preventing the entrance of worms and insects. The timber thus incasing a continuous body or strata of antiseptic agents is then immersed in a solution of coal-tar and powdered charcoal, either hot or cold, in equal or unequal proportions, in a tank, the effect of which is to impregnate the timber with carbon, one of the best known preservatives of fibrous materials, which, when combined with the creosote of the coal-tar, acts as a conveyant, assists its absorption by the fiber of the material, and thus carbon is caused to penetrate the fibers of the wood and saturate it toward the center, completely filling up the pores of the timber and rendering it sufficiently hard to resist and keep out moisture, whether from the earth or air.

After this interior and continuous strata impregnation, the timber is immersed in a mixture of coal-tar and powdered charcoal, either hot or cold, prepared in equal or unequal proportions, in a suitable tank, the effect of which is to impregnate the timber with carbon, one of the best known preservatives of fibrous materials, which, when combined with the creosote of the coal-tar, acts as a conveyant, assists its absorption by the fiber of the material, and thus carbon is caused to penetrate the fibers of the wood, and saturate it toward the center, completely filling up the pores of the timber and rendering them sufficiently hard to resist and keep out moisture, whether from the earth or air.

After being submitted to this bath a sufficient length of time to be saturated, it is then coated with a composition consisting of asphaltum or mineral pitch, eighty parts; sulphur, five parts; arsenic, five parts; coal-tar, five parts; powdered charcoal, five parts, aggregating one hundred parts. This compound is applied in a state of fusion, and will so effectually cover the surface of the wood as to render it impervious to atmospheric decomposition, or the penetration of water. This coating becomes perfectly hard, adheres with great tenacity to the surface of the wood, and is not affected either by the heat or cold, and thus forms a case which insulates the wood so perfectly from the decaying influences of the elements as to preserve it for a much greater length of time than by any other mode heretofore employed.

The chemical action of the several ingredients causes the compound to penetrate the fibers and pores of the wood and causes them to run into concretions, and to knit so closely and compactly as to change their character from a destructible to an almost indestructible condition.

This invention is especially applicable to the preservation of railroad timbers, but may be used to preserve other fibrous materials of lighter texture. Before the last coating becomes hard, the timbers are covered with sand to prevent them from adhering to each other and to render the coating more durable.

Having described my process for preserving timber and the materials used for that purpose, I claim—

1. The use of chloride of arsenic, or arsenic and chloride of sodium combined, in a dry or semi-liquid form, for impregnating wood in separate and distinct strata, as herein described.

2. Railroad ties or other timber bored with a central hole or holes extending from one end to the other filled from both ends so as to form a continuous interior strata of antiseptic or preservative agents, and sealed at both ends in such manner as to cause it to permeate the timber in continuous longitudinal lines and transverse vanes from its center to its sides, as herein described.

3. Timber impregnated with separate and distinct strata of preservative agents, submitted to a bath of coal-tar and powdered charcoal, substantially as herein described.

4. Carbonizing wood by immersing it in a solution of coal-tar and powdered charcoal, either hot or cold, substantially as described.

5. Coating wood or other fibrous material with a composition of asphaltum or mineral pitch, sulphur, arsenic, coal-tar, and powdered charcoal, when compounded in or in about in the proportions as herein described for the purpose of rendering its surface impervious to atmospheric decomposition or the penetration of moisture, substantially as herein described.

6. The process herein described for preserving timber.

In testimony whereof I have hereunto set my hand.

A. B. TRIPLER.

Witnesses:
T. H. UPPERMAN,
A. E. H. JOHNSON.